United States Patent
Fleetwood et al.

(10) Patent No.: US 11,687,740 B2
(45) Date of Patent: *Jun. 27, 2023

(54) SYSTEM AND METHOD FOR DETECTING AN ADDITION OF A GAME PIECE TO A STACK OF GAME PIECES

(71) Applicant: Patently Modern, Inc., Playa Vista, CA (US)

(72) Inventors: Alex Fleetwood, London (GB); George Buckenham, London (GB); Tim Burrell-Saward, London (GB); Chris Shaw, Bury (GB); Lyall Mccarthy, Surrey (GB); Elies Dekoninck, Bath (GB)

(73) Assignee: PATENTLY MODERN, INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,506

(22) Filed: Mar. 15, 2021

(65) Prior Publication Data
US 2021/0200966 A1 Jul. 1, 2021

Related U.S. Application Data

(63) Continuation of application No. 16/080,424, filed as application No. PCT/IB2017/051135 on Feb. 2, 2017, now Pat. No. 10,949,628.
(Continued)

(51) Int. Cl.
*G08B 13/14* (2006.01)
*G06K 7/10* (2006.01)

(52) U.S. Cl.
CPC ..... *G06K 7/10099* (2013.01); *G06K 7/10108* (2013.01); *G06K 7/10237* (2013.01)

(58) Field of Classification Search
CPC .......... G06K 7/10099; G06K 7/10108; G06K 7/10237; A63F 2009/2489; A63F 2250/1021; G07G 1/0072
(Continued)

(56) References Cited

U.S. PATENT DOCUMENTS

| 7,275,690 B1 | 10/2007 | White |
| 8,398,489 B2 * | 3/2013 | Lutnick ............... G07F 17/3288 463/19 |

(Continued)

OTHER PUBLICATIONS

Liu article titled "'Beasts of Balance' and Where to Find Them—GeekDad", Feb 16, 2016, XP055373960, URL:https:1/ geekdad.com/2016/02/fabulous-beasts-2/.
(Continued)

*Primary Examiner* — Tai T Nguyen
(74) *Attorney, Agent, or Firm* — Dority & Manning, P.A.

(57) ABSTRACT

Described herein are systems and method for determining a presence and/or type of an object positioned on a platform. The system may include: a tag reader configured to determine a type of an object, the object including a tag readable by the tag reader; a load cell configured to detect the presence of the object on a platform, the object having a known weight; and the platform including at least one face for receiving the object. The platform is communicatively coupled to the load cell and the tag reader. The presence of the object is detected by the load cell housed in the platform when the object is position on the at least one face of the platform. The type of the object is determined by the tag reader housed in the platform when the object is in physical proximity to the platform.

19 Claims, 10 Drawing Sheets

Related U.S. Application Data

(60) Provisional application No. 62/301,191, filed on Feb. 29, 2016.

(58) Field of Classification Search
USPC .................................................. 340/572.1
See application file for complete search history.

(56) References Cited

U.S. PATENT DOCUMENTS

| | | |
|---|---|---|
| 8,669,861 B1 | 3/2014 | Meyers |
| 2006/0208893 A1 | 9/2006 | Anson et al. |
| 2010/0139989 A1 | 6/2010 | Atwater et al. |
| 2012/0077593 A1* | 3/2012 | Sarmenta .............. A63F 13/327 |
| | | 463/40 |
| 2013/0284806 A1 | 10/2013 | Margalit |
| 2014/0316561 A1 | 10/2014 | Tkachenko et al. |
| 2015/0133023 A1 | 5/2015 | Lewis et al. |
| 2017/0039843 A1* | 2/2017 | Paulson .............. G08B 25/008 |
| 2017/0176239 A1 | 6/2017 | Pan |

OTHER PUBLICATIONS

Donlan article titled "Fabulous Beasts is Jengaforthe gods", Jan. 27, 2016, XP055373962, URL:http://www.eurogamer.net/articles/2016-01-27-fabulous-beasts-is-jenga-for-the-gods.
International Search Report dated Jun. 6, 2017 from International Application No. PCT/IB2017/051135, 4 pgs.
Written Opinion dated Jun. 6, 2017 from International Application No. PCT/IB2017/051135, 7 pgs.

* cited by examiner

SYSTEM AND METHOD FOR DETECTING AN ADDITION OF A GAME PIECE TO A STACK OF GAME PIECES

CROSS-REFERENCE TO RELATED APPLICATIONS

The present application is a continuation of U.S. patent application Ser. No. 16/080,424, filed Aug. 28, 2018, now U.S. Pat. No. 10,949,628, which is a national stage filing under 35 U.S.C. § 371 of Patent Cooperation Treaty Application Number PCT/IB2017/051135 having a filing date of Feb. 2, 2017, which claims the benefit of U.S. Provisional Patent Application Ser. No. 62/301,191, entitled "Systems and Methods for determining the presence and type of an object," filed Feb. 29, 2016. Applicant claims priority to and the benefit of each of such applications.

TECHNICAL FIELD

This invention relates generally to the consumer products, gaming, and logistics fields, and more specifically to new and useful systems and methods for determining the presence and type of an object.

BACKGROUND

According to a 2013 study by Spil Games, 1.2 billion people worldwide are playing games. Of those 1.2 billion people, 700 million people worldwide are playing games online. Further, the worldwide gaming market is a $70.4 billion industry with an expected growth rate of 6% yearly (Spil Games, "State of Online Gaming Report," 2013, pp. 1-17.). These numbers largely represent individuals either playing physical games (e.g., board games, cards, etc.) or online games (e.g., mobile applications, Internet sites, etc.) There are very few games in which events in the physical world impact events in a virtual world (or digital user experience) or vice versa. Some games allow users to manipulates an input device, for example a joystick, weapon, remote, his/her body, etc., to effect changes in the virtual world, but such games do not connect playing of a physical game with physical objects to a virtual world with virtual objects.

Further, the technology used to link the physical and virtual worlds, and to inform the virtual world when an even occurs in the physical world, is widely applicable to other industries, for example logistics and consumer products. For example, the need to know where product is located relative to another product, a presence of the product, a type of the product, characteristics (e.g., weight) of the product, and to notify a driver, manager, personnel, etc. of the location of the product using a digital user experience is necessary in the field of logistics.

Thus, there is a need for a new and useful systems and methods for determining the presence and type of an object. This invention provides such new and useful systems and methods.

SUMMARY

One aspect of the present disclosure is directed to a system for determining one or more of a presence of an object and a type of the object in a defined area. In some embodiments, the system includes: a tag reader configured to determine the type of the object, a load cell configured to detect the presence of the object in the defined area; and a platform including a bottom face for contacting a support surface and a top face configured to provide a surface for receiving the object. In some such embodiments, the object has a known weight. In some embodiments, the object includes a tag that is readable by the tag reader, and the load cell detects the known weight of the object in the defined area. In some embodiments, the bottom and top faces define a housing configured to receive the load cell and the tag reader. In some such embodiments, the presence of the object is detected by the load cell housed in the platform when the object is positioned on the top face of the platform, and the type of the object is determined by the tag reader housed in the platform when the object is in physical proximity to the platform.

In some embodiments, the system further includes the object.

In some embodiments, the system further includes a first processor communicatively coupled to the tag reader and the load cell. In some such embodiments, the platform includes a computer-readable medium having non-transitory, processor-executable instructions stored thereon, so that execution of the instructions causes the first processor to perform a method. In some embodiments, the method includes: receiving an output from one or more of the tag reader and the load cell. In some such embodiments, the output comprises one or more of the presence of the object and the type of the object.

In some embodiments, the system includes a computing device including a second processor. In some such embodiments, the computing device is communicatively coupled to the platform. Further, in some such embodiments, the method performed by the first processor includes: transmitting the output from one or more of the tag reader and the load cell to the computing device.

In some embodiments, the output includes a real time data feed of a status of the object.

In some embodiments, the method performed by the second processor further includes: analyzing the real-time data feed of the status of the object; and determining one or more of; an amount of lapsed time between determining the type of the object and the presence of the object; a quality of positioning of the object on the platform; and a completion of a challenge.

In some embodiments, the method performed by the second processor further includes: displaying or updating a digital user experience based on the output from the platform.

In some embodiments, the tag comprises one of a radiofrequency identification tag, a near field communication tag, and a low-energy Bluetooth tag.

In some embodiments, the top face is flat.

In some embodiments, the bottom face is flat.

In some embodiments, the type of the object is one of a beast piece, an action piece, an element piece, and a miracle piece.

In some embodiments, the type of the object is one of a consumable product and a non-consumable product.

In some embodiments, the type of the object is one of an object for measuring one or more of dexterity, coordination, memory, and motor skills.

In some embodiments, the presence of the object is detected by determining the known weight of the object in the defined area.

Another aspect of the present disclosure is directed to a system for identifying the addition of one object into a group of objects. In some embodiments, the system includes: load cell configured to detect a presence of an object; a tag reader configured to determine a type of the object; and a platform communicatively coupled to the load cell and the tag reader. In some such embodiments, the presence of the object is detected by the load cell when the object is positioned on a face of the platform, and the type of the object is determined by the tag reader when the object is in physical proximity to the platform.

Another aspect of the present disclosure is directed to a game for identifying objects in a stack and updating a digital user experience based on the objects identified in the stack. In some embodiments, the game includes: an object of known weight comprising a tag; a tag reader configured to determine a type of the object; a load cell configured to detect a presence of the object in a defined area; and a platform including at least one face, the at least one face configured to receive the object. In some such embodiments, the tag of the object is readable by the tag reader. In some embodiments, the platform is communicatively coupled to the load cell and the tag reader. In some embodiments, the presence of the object is detected by the load cell when the object is positioned on the at least one face of the platform. In some embodiments, the type of the object is determined by the tag reader when the object is in physical proximity to the platform.

In some embodiments, the type of the object is one of a beast piece, an action piece, an element piece, and a miracle piece.

In some embodiments, the game further includes a computing device including a processor. In some such embodiments, the computing device includes a computer-readable medium having non-transitory, processor-executable instructions stored thereon, so that execution of the instructions causes the processor to perform a method. In some embodiments, the method includes: receiving an output from the platform, such that the output details one or more of the presence and type of the object; and displaying the digital user experience, such that the digital user experience presents the object based on the output from the platform or updates in response to the output from the platform.

In some embodiments, the output is received in real-time.

In some embodiments, the game further includes a computing device including a processor. In some embodiments, the computing device is configured to display a digital user experience. Further, in some such embodiments, the computing device includes a computer-readable medium having non-transitory, processor-executable instructions stored thereon, so that execution of the instructions causes the processor to perform a method. In some embodiments, the method includes: receiving an output from the platform, such that the output details one or more of the presence and type of the object; and updating the digital user experience displayed by the computing device in response to the output from the platform.

In some embodiments, the game further includes a computing device including a processor, such that the computing device is configured to display a digital user experience. In some such embodiments, the computing device includes a computer-readable medium having non-transitory, processor-executable instructions stored thereon, so that execution of the instructions causes the processor to perform a method. In some embodiments, the method includes: receiving an output from the platform, such that the output details one or more of the presence and type of the object; and updating a feature of the digital user experience in response to the output from the platform.

In some embodiments, the feature is one or more of a characteristic of a beast and an environment surrounding the beast.

Another aspect of the present disclosure is directed to a system for determining one or more of a presence of an object and a type of the object in a defined area. In some embodiments, the system includes: a tag reader configured to determine the type of the object, such that the object has a known weight, and the object includes a tag that is readable by the tag reader; a load cell configured to detect the presence of the object in the defined area, such that the load cell detects the known weight of the object in the defined area; and a platform configured to receive the object. In some embodiments, the platform is communicatively coupled to the load cell and the tag reader. In some embodiments, the presence of the object is detected by the load cell when the object is positioned on the platform. In some embodiments, the type of the object is determined by the tag reader when the object is in physical proximity to the platform.

Another aspect of the present disclosure is directed to a method of identifying objects in a stack and displaying the objects in a digital user experience. In some embodiments, the method includes: identifying a type of a first object using a tag reader, such that the first object includes a tag, and the first object is identified when it is in physical proximity to the tag reader; representing the type of the first object in a digital user experience displayed on a display of a computing device, such that the computing device is communicatively coupled to the tag reader and a load cell; receiving the first object on a platform, such that the platform is communicatively coupled to the tag reader and the load sensor; detecting, using the load sensor, a presence of the first object on the platform; and updating the digital user experience displayed on the display of the computing device to indicate that the first object was positioned on the platform.

In some embodiments, the method further includes limiting an amount of time a user has to position the first object on the platform.

In some embodiments, the method further includes penalizing the user for not positioning the first object on the platform in the amount of time.

In some embodiments, the method further includes receiving a second object on the platform. In some such embodiments, the second object is positioned one of: on top of the first object, adjacent to the first object, and underneath or below the first object.

In some embodiments, the method further includes penalizing a user for dislodging one or more of the first and second objects.

In some embodiments, the method further includes notifying a user of one or more of: the first object being identified by the tag reader, the first object being detected by the load cell, the digital user experience being updated, and the first object being dislodged from the platform.

In some embodiments, the method further includes ending the game if a user dislodges the first object from the platform.

In some embodiments, the digital user experience is updated in real-time.

DETAILED DESCRIPTION

The foregoing is a summary, and thus, necessarily limited in detail. The above mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Described herein are systems and methods designed for use by a user. A user may include a person who plays games, a person who borrows or buys products, a person who is part of a product shipping and/or delivery process, and/or a healthcare provider.

For example, a person who plays games includes a gamer, a player, a child, a teenager, an adult, a gambler, a person who plays games online, a person who plays physical games, etc.

For example, a person who borrows or buys products includes a customer at a supermarket, mall, outlet, store, etc.; a person who borrows physical materials and/or audio/visual materials from a library; a person who rents audio/visual materials from a video store; a person who buys physical materials and/or audio/visual materials from a bookstore, etc.

For example, a person who is part of a product shipping and/or delivery process includes a manufacturer; warehouse personnel; a logistics company or personnel within the company; personnel in any facility that ships materials and/or products; etc.

For example, a healthcare provider includes a physical therapist (e.g., geriatric, orthopedic, neurological, cardiopulmonary, pediatric, etc.), a family practitioner, a neurologist, orthopedic doctor and/or surgeon, oncologist, etc.

In some embodiments, a user does not directly interact with the system. For example, the system may determine the presence and type of the object (e.g., stock, deliveries, shipments, etc.) and the user may oversee, review, and/or validate the presence and type of the object.

Described herein are systems and methods designed to determine the presence, and/or type of an object. In some embodiments, an object may include a game piece, and object for outdoor use (e.g., landscaping, leisure, etc.), an object for indoor use, furniture, clothing, jewelry, vehicle, animal, pharmaceuticals, packages, shipments, parcels, mail, biologics, and/or any other object or item, living or inanimate.

Figure 2A:
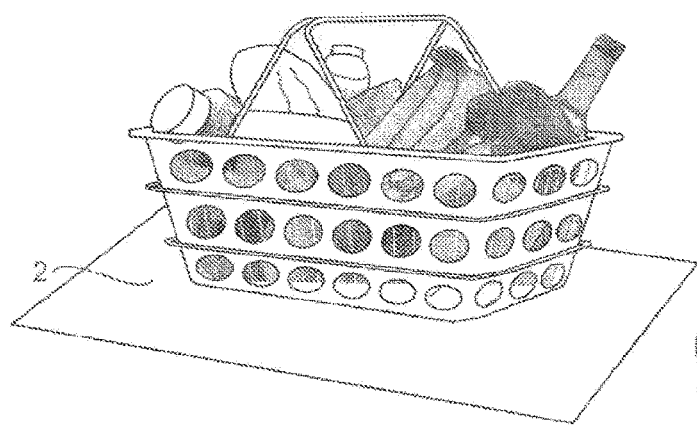
FIG. 2A illustrates one embodiment of a system for determining a presence of an object and/or a type of the object in a defined area.

In some embodiments, an object is consumable. In some such embodiments, the object is: a food item (FIG. 2A); a beverage (FIG. 2A); a liquid; a pharmaceutical; etc.

Figure 2B:
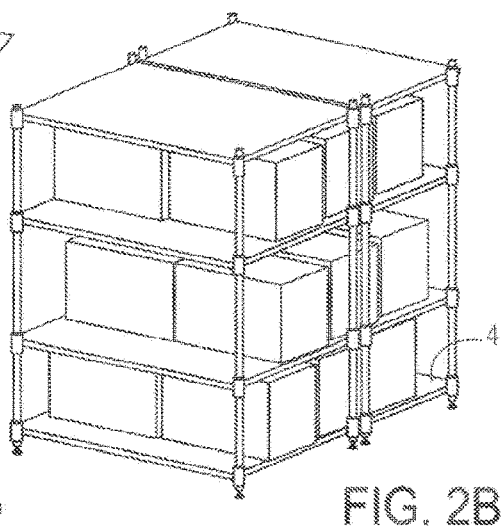
FIG. 2B illustrates one embodiment of a system for determining a presence of an object and/or a type of the object in a defined area.
Figure 2C:
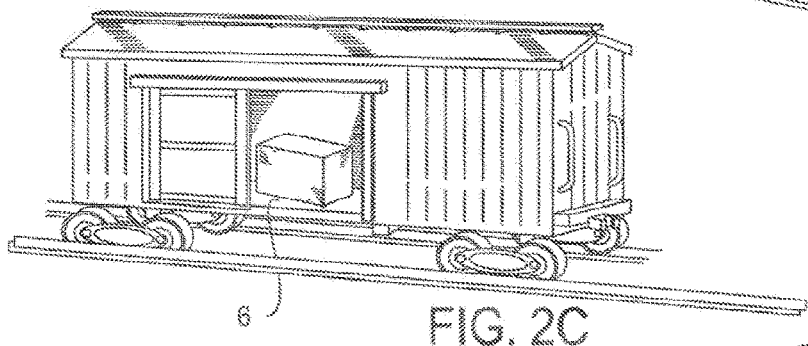
FIG. 2C illustrates one embodiment of a system for determining a presence of an object and/or a type of the object in a defined area.
Figure 2D:
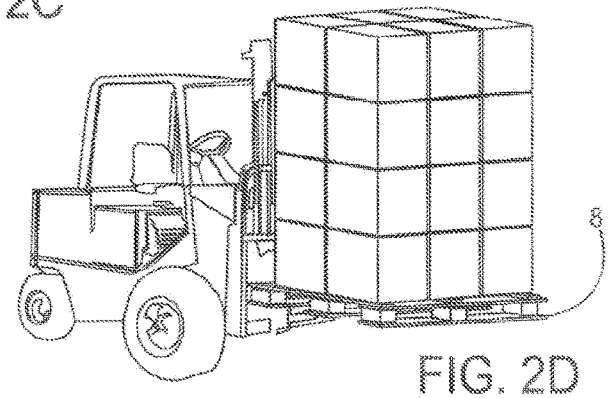
FIG. 2D illustrates one embodiment of a system for determining a presence of an object and/or a type of the object in a defined area.

In some embodiments, an object is non-consumable. In some such embodiments, the object is: freight (FIG. 2C); a game piece (FIGS. 6A-6D); a package (FIG. 2B and FIG. 2D); a delivery; a shipment; a parcel (FIG. 2B and FIG. 2D); cargo; furniture; lumber; stone; clothing, etc.

In some embodiments, the object is configured for measuring dexterity, coordination, memory, and/or motor skills of a user. For example, the system may measure a user's ability to stack objects on a platform without dislodging other objects in the stack; remember when (e.g., last, second to last, first, etc.) the user positioned an object on the platform and/or in which order the objects were stacked; or any other type of exercise.

In some embodiments, the user is in a particular user state while stacking the object. Non-limiting examples of user states include one object in one hand, one object in each hand, one object in dominant hand or non-dominant hand, user sitting while stacking, user standing on two feet while stacking, user standing on one foot while stacking, and user closing one eye while stacking.

In some embodiments, a weight of the object is known. For example, the system may detect the presence of the object by detecting the weight of the object, verifying the detected weight against a known weight of the object, and/or confirming that the object was positioned on the platform by detecting the presence or weight of the object on the platform.

In some embodiments, the object includes a tag coupled to, within, or next to the object. The tag may be readable by a tag reader, as described elsewhere herein.

In some embodiments, a tag indicates: a manufacturing date of the object; a shipment date of the object; a location of the object (e.g., on the platform, near the platform, in the warehouse, in the cargo hold, at the final destination, delivered, in an environment, etc.), a delivery date of the object; a receipt date of the object; a type of the object (e.g., consumable, non-consumable, which game piece it is, etc.); a name of the object; a characteristic of the object (e.g., game piece type, shape, color, weight, etc.); a per unit dose of the object (e.g., for pharmaceuticals, vitamins, etc.); a return date of the object; a warranty date of the object; rules associated with the object (e.g., when playing a game with the object, for return, for warranty work or repair, etc.); a price of the object; an expiration date of the object; a best by date of the object; a use by date of the object; composition of the object (e.g., fabric, ingredients, plastics, etc.); country of origin of the object: feature(s) of the object (e.g., organic, grass-fed, free-range, shape, color, weight, size, etc.); or any other parameter or information.

In some embodiments, a tag provides an identifier, which is used, for example, to look up information in a database or lookup table or query information using one or more search engines.

Figure 7:
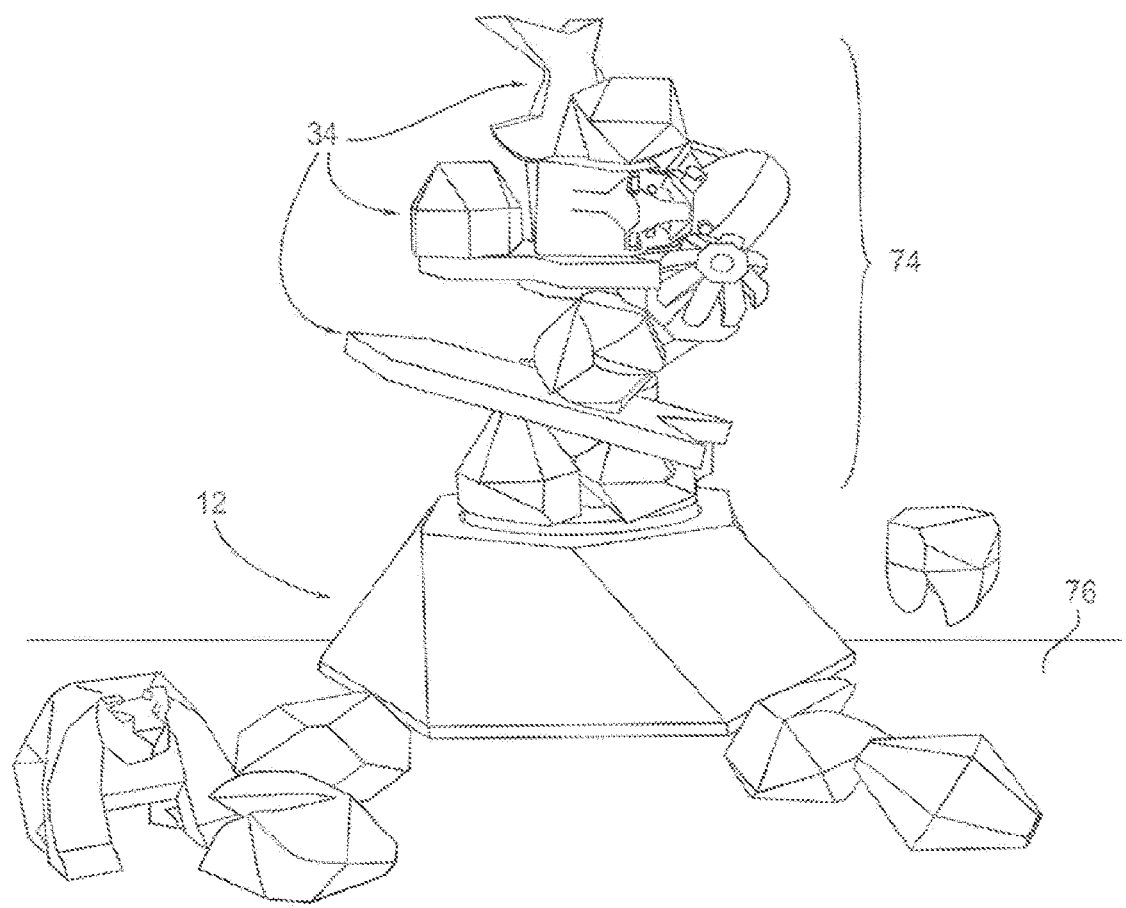
FIG. 7 illustrates one embodiment of a plurality of objects positioned on a platform.

In some embodiments, the one or more objects are stackable or positionable relative to one another on a platform. For example, a first object may be positioned on top of, adjacent to, underneath, in parallel to, perpendicular to, etc. a second object or a plurality of objects, as shown in FIG. 2A, FIG. 2B, FIG. 2D, and FIG. 7. In one embodiment, as shown in FIG. 7, a plurality of objects 34 is positioned in a stack 74 on the platform 12, for example a vertical stack.

In some embodiments, a platform comprises a base, surface, or face on which objects are stacked or positioned (FIGS. 5A-5C); a scale, surface, or area 2 (FIG. 2A); a shelf or shelving unit 4 (FIG. 2B); a floor or surface in a boxcar, cargo hold, or trunk 6 (FIG. 2C); a surface on a vehicle or machine 8 (FIG. 2D); or any other surface or structure communicatively coupled to a load cell and/or tag reader and/or configured to house a load cell and/or tag reader.

Described herein are methods for identifying an object or a plurality of objects in stack. In some embodiments, information or data about an object or plurality of objects is input into a system, for example a computing device. In some embodiments, the system verifies or determines the identity of, presence of, location of, or information about the object or plurality of objects by reading a tag associated with the object or the plurality of objects. In some embodiments, the system verifies the presence of the object, for example by detecting the presence (e.g., weight) of the object or the plurality of objects on a platform. In some embodiments, each object has a unique tag. Alternatively, in some embodiments, a collection or plurality of objects has the same tag.

SYSTEM

Figure 1:
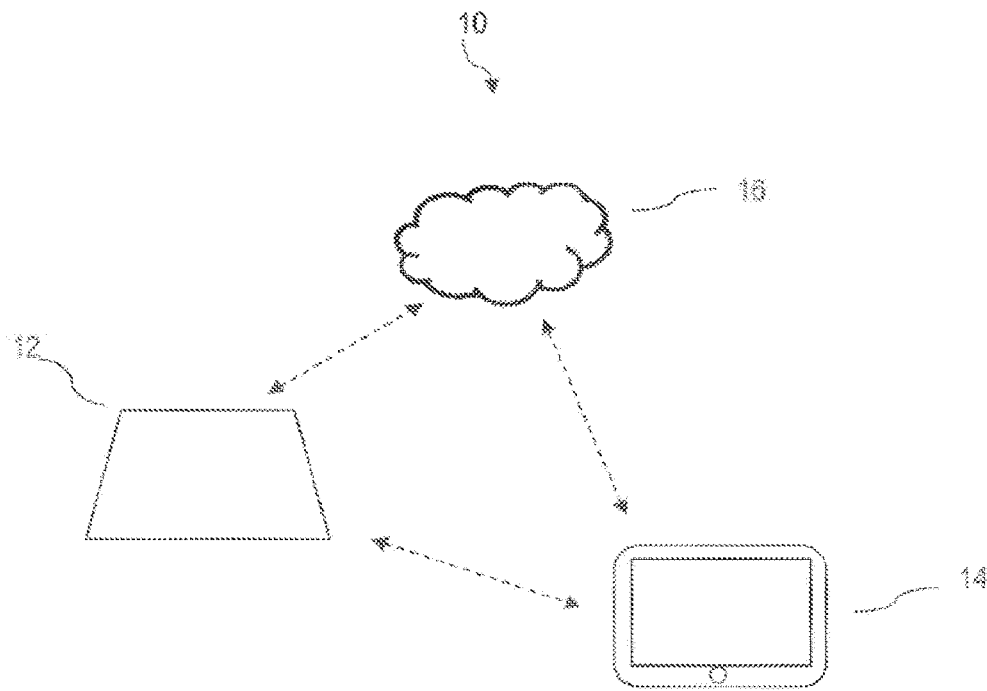
FIG. 1 illustrates one embodiment of a system for determining a presence of an object and/or a type of the object in a defined area.

In some embodiments, as shown in FIG. 1, a system 10 for determining the presence and/or type of an object includes a platform 12 communicatively coupled to a load cell and tag reader: optionally, a computing device 14 communicatively coupled to the platform and, optionally, the load cell and tag reader; and, optionally, a server 16. Various components of the system 10 function to detect an object on the platform 12 and/or determine a type or characteristic of an object.

Figure 3:
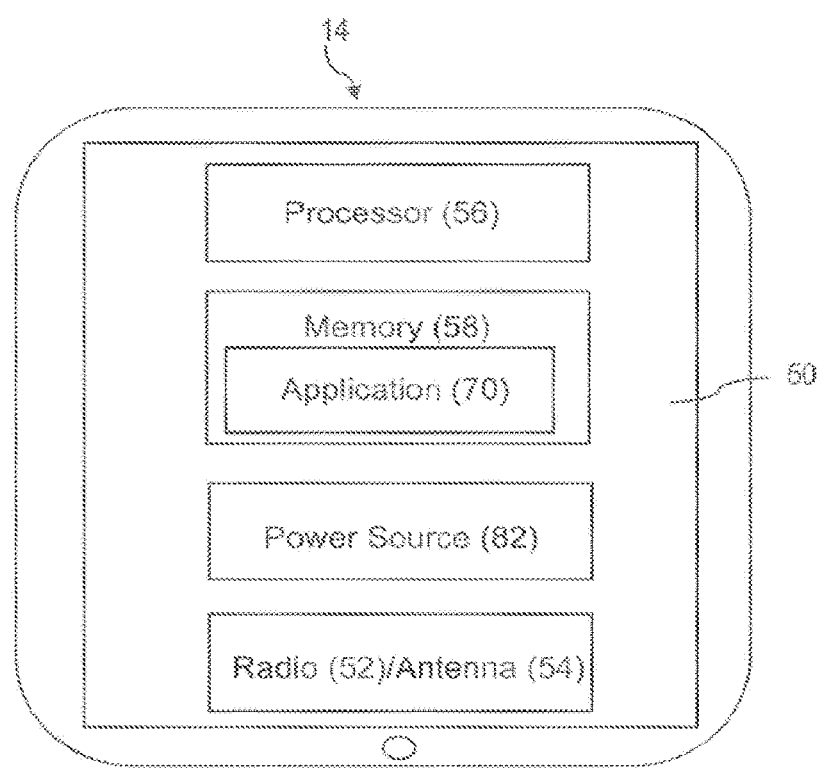
FIG. 3 illustrates one embodiment of a computing device.
Figure 4:
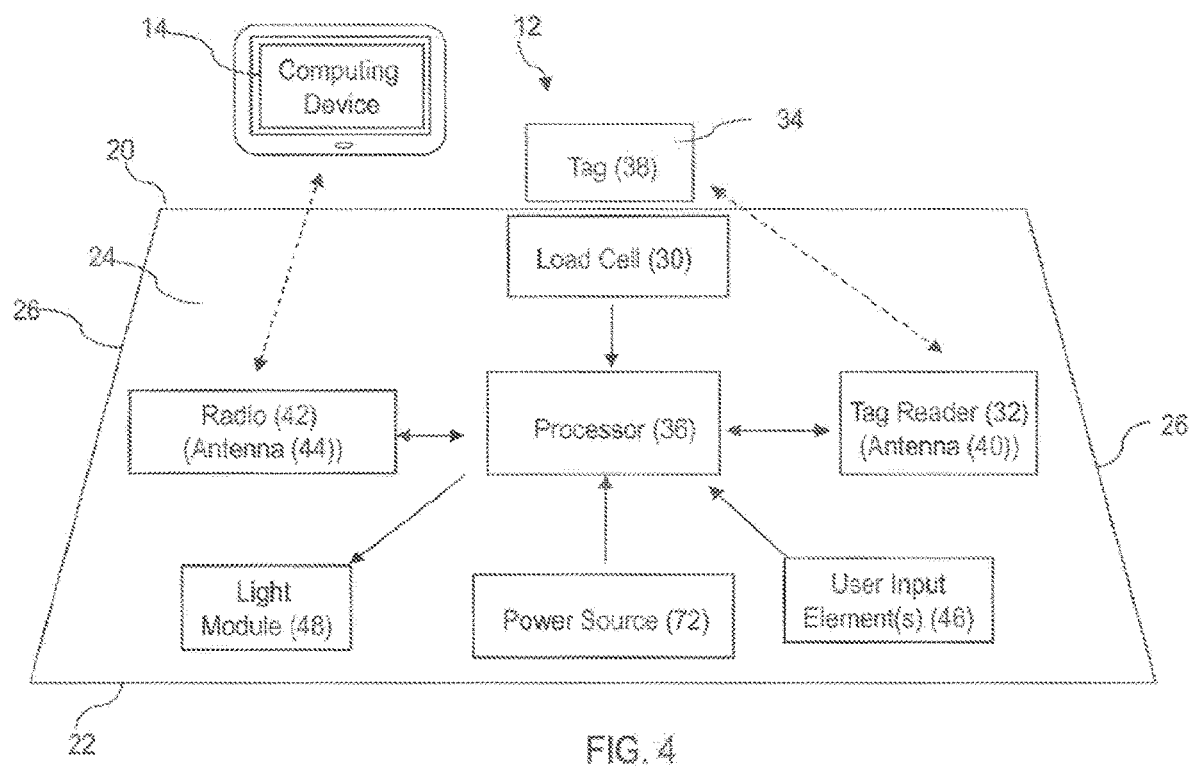
FIG. 4 illustrates one embodiment of a platform.

In some embodiments, there is one-way or two-way communication between the computing device 14 and the server 16, the computing device 14 and the platform 12, and/or the server 16 and the platform 12. The computing device 14, platform 12, and/or server 16 may communicate wirelessly (i.e., send or transmit information) via a wired connection (e.g., IEEE 1394, Thunderbolt, Lightning, DVI, HDMI, Serial, Universal Seral Bus, Parallel, Ethernet, Coaxial, VGA, PS/2) or wirelessly (e.g., via Bluetooth, low energy Bluetooth, near-field communication, Infrared, WLAN, or other RF technology). In one embodiment, as shown in FIG. 3 and FIG. 4, the platform 12 and/or computing device 14 include one or more radios 42, 52 (e.g., Bluetooth, BLE, etc.) and antennas 44, 54 for intercommunication. For example, the platform radio 42 transmits a signal (e.g., radio waves or radiofrequency) to the computing device 14 via an antenna 44, and the computing device 14 receives the signal and analyzes the information in the signal (e.g., type of game piece being played, product type, etc.). As shown in FIG. 1 and FIG. 4, the computing device 14 may receive and/or import data from the platform 12 to update a digital user experience rendered or created by the computing device 14, and, optionally, displayed to a user, as described in further detail elsewhere herein.

In some embodiments, as shown in FIG. 1, the system 10 optionally includes a server 16. The server functions to store data and/or to share data between system components. The server 16 may be a local server on the computing device or a remote server. In some embodiments, the server 16 is a virtual server. In some embodiments, the server 16 may share data between the computing device 14 and the platform 12. In some embodiments, the server 16 may push notifications, updates, and/or information to the computing device 14 and/or platform 12, for example, to update an operating system or application executed by the computing device 14 and/or platform 12; and/or to notify the user of a system feature, setting, malfunction, update, and/or alert.

Figure 5A:
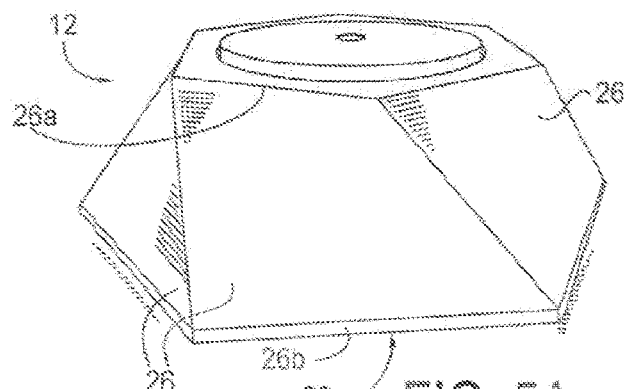
FIG. 5A illustrates a side view of one embodiment of a platform.

In some embodiments, as shown in FIG. 1, FIG. 4, and FIGS. 5A-5C, the system 10 further includes a platform 12. The platform 12 functions to receive an object on a surface, in a defined area, and/or on a face of the platform 12. In some embodiments, the platform 12 includes at least one face 20 configured to provide a surface for receiving an object. In one variation, as shown in FIG. 5A, the platform 12 includes a first face or bottom face 22 for contacting a support surface 76 (e.g., table, floor, lap of a user, etc.), and a second face or top face 20 for receiving an object. The top 20 and/or bottom 22 face may be flat, planar, irregular, pointed, etc. In one variation, the top 20 and/or bottom 22 face is flat.

In some embodiments, as shown in FIG. 4, the top 20 and bottom 22 faces of the platform 12 together define a housing 24 for receiving a load cell 30 and/or tag reader 32. The top face 20, bottom face 22, and/or sidewalls 26 may be any size, shape, and/or color. In some embodiments, the top face 20, bottom face 22, and/or sidewalls 26 may be: circular, hexagonal, rectangular, triangular, a parallelogram, etc. In one such embodiment, the top 20 and bottom 22 faces are hexagonal and the sidewalls 26 are each a parallelogram. For example, the hexagon of the top face 20 may be offset from the hexagon of the bottom face 22. Alternatively, the hexagons of the top 20 and bottom 22 faces may be aligned. In some embodiments, there may be 1-20 sidewalls 26. In some embodiments, there may be 1-10 sidewalls 26. In one embodiment, there are six sidewalls 26 coupled to the top 20 and bottom 22 faces, with each sidewall 26 coupled to the top face 20 on a first side 26a opposite a second side 26b to which the bottom face 22 is coupled, as shown in FIG. 5A. In some embodiments, the top face 20 has a surface area smaller than the bottom face, equal to the bottom face, or larger than the bottom face. In one such embodiment, the surface area of the bottom face 22 is larger than that of the top face 20.

Figure 5B:
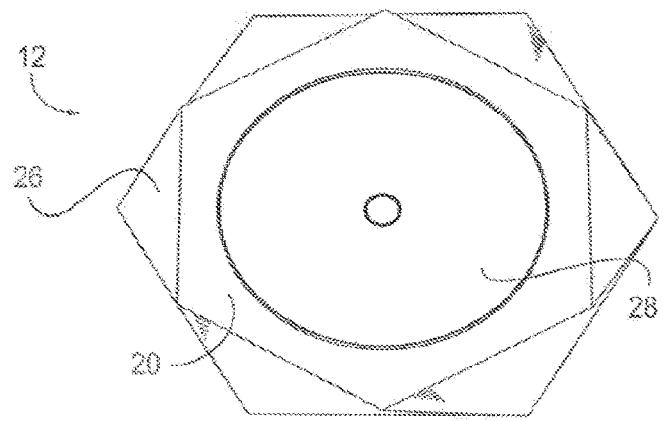
FIG. 5B illustrates a top view of one embodiment of a platform.

In some embodiments, as shown in FIG. 5A and FIG. 5B, the top face 20 of the platform 12 includes a surface or defined area 28 configured for receiving one or more objects. In some embodiments, the shape and/or size of the defined area or surface 28 corresponds to a detectable area of the load cell, such that an object positioned on the surface or in the defined area 28 is detected by the load cell. For example, the defined area 28 may be any size, shape, and/or color. In some embodiments, the defined area 28 may be: circular, hexagonal, rectangular, triangular, a parallelogram, etc. In one such embodiment, the defined area 28 is a circle or circular.

Figure 6A:
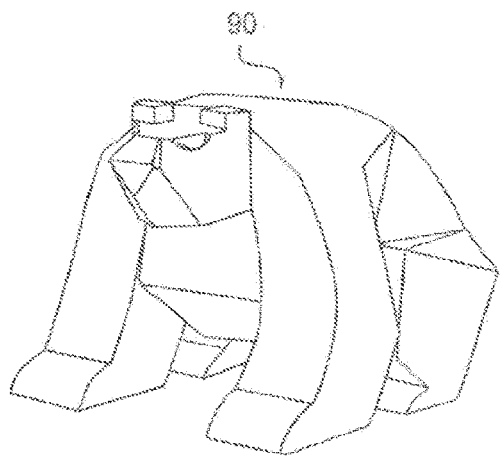
FIG. 6A illustrates one embodiment of an object.
Figure 6B:
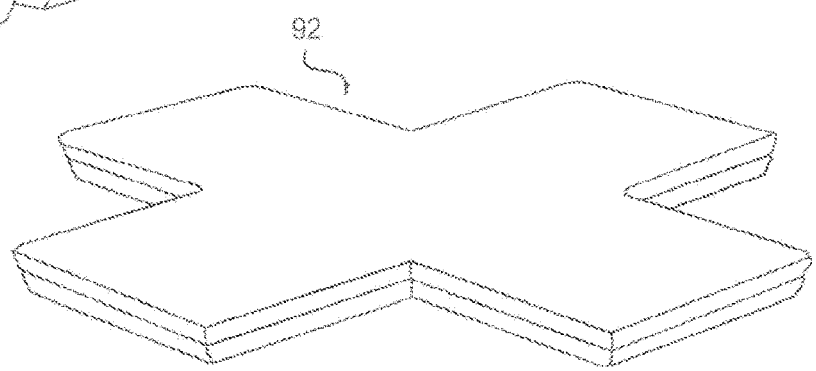
FIG. 6B illustrates one embodiment of an object.
Figure 6C:
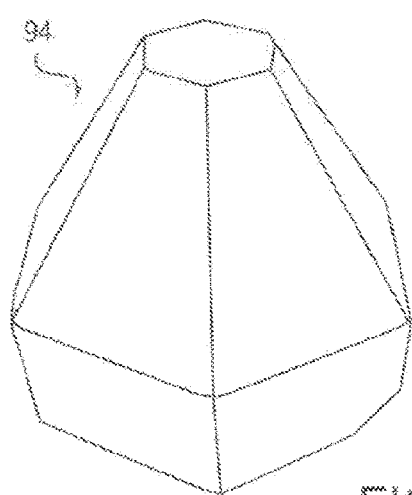
FIG. 6C illustrates one embodiment of an object.
Figure 6D:
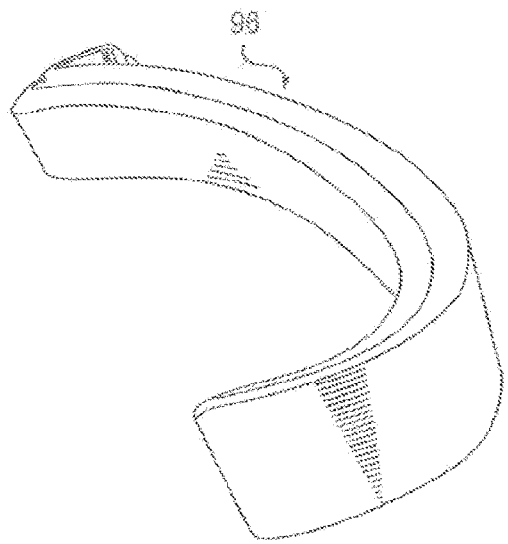
FIG. 6D illustrates one embodiment of an object.

In some embodiments, a face 20 of the platform 12 is configured to provide a surface or defined area 28 for receiving an object. Non-limiting examples of objects include: a beast, an action piece, an element piece, and/or a miracle piece. As shown in FIG. 6A, a beast may be shaped similar to flora, fauna, mammals, reptiles, fish, plants, etc. on land, in air, or in sea. As shown in FIG. 6B, an action piece may be shaped similar to a cross, hash mark, slash, etc. As shown in FIG. 6C, an element piece may be shaped similar to wind, fire, water, earth, etc. or represent wind, fire, water, earth, etc. As shown in FIG. 6D, a miracle piece may be shaped similar to an arc, semi-circle, handle, etc.

In some embodiments, when an object is positioned on the platform, at least one of a presence and type of the object is detected by at least one of the load cell and tag reader. For example, as shown in FIG. 6A, when a beast 90 is positioned on the platform 12, the beast 90 is detected by at least one of the load cell and tag reader. At least one of a presence and type of the beast 90 is transmitted from the platform 12 to the computing device 14 so that the beast 90 may be displayed in a virtual world or digital user experience on the computing device. Alternatively, in some embodiments, the platform 12 is configured to display the beast in the virtual world or digital user experience. Each beast 90 is displayed in the digital user experience with a pre-determined set or number of points.

Further for example, as shown in FIG. 6B, the action piece 92 may include a migrate piece or a cross piece. The action pieces 92 function to facilitate physical stacking or positioning of the objects on the platform 12. For example, the migrate and cross pieces are flat or planar in shape. In some embodiments, the migrate and cross ;ices are shaped as a rectangle, square, circle, triangle, cross, etc. In one embodiment, the migrate piece is a rectangle and the cross piece is a cross. Further, in some embodiments of a game in which the migrate piece is used, the migrate piece takes one object or beast in a first environment of the digital user experience and creates a new object or beast in a second or different environment of the digital user experience. For example, an object or beast in an air environment would change to an object or beast in a land or sea environment. The cross piece, when played, cross-breads two beast objects to create a new beast. Each time a new object or beast is created in the digital user experience, the new object or beast is given a new name.

Further for example, as shown in FIG. 6C, an element piece 94 adds points to a beast 90 or object. In some variations, the element piece 94 functions to keep a beast 90 from extinction by adding points to the beast. In some embodiments, an element piece comprises two halves. In some such embodiments, each half adds a set number of points to an environment (e.g., land, sea, air, surrounding the object, etc.) of the digital user experience. The element piece 94 may be shaped or colored similar to water, fire, wind, earth, nitrogen, hurricane, typhoon, tsunami, earthquake, etc.

Further, as shown in FIG. 6D, a miracle piece 96 functions to encourage user interaction with the system components (e.g., platform, load cell, tag reader, computing device, etc.). For example, a miracle piece 96 may be a point multiplier (e.g., points x2, x3, x4, x5, xn . . . ) if a user meets a challenge indicated by the system. In some embodiments, the challenge is a physical challenge (e.g., involves one or more objects and/or the platform). In some such embodiments, a physical challenge includes: positioning an object on the platform in a pre-determined period of time or a limited amount of time; not dislodging or disrupting a stack of objects; applying weight to the piece and thus the platform (e.g., to be measured by the load cell); removing an object or a plurality of objects from the platform; replaying an object or a plurality of objects removed from the platform: etc. In some embodiments, the challenge is a digital challenge (e.g., selecting a user input device and/or changing an aspect of the digital user experience). In some such embodiments, a digital challenge includes: pressing or selecting a user input element as the same or different user positions an object on the platform or removes an object from the platform; selecting a user input element to change or alter an appearance of the digital user experience; etc. The miracle piece 96 may be shaped similar to a rod, an arc, a T, etc.

In some embodiments, as shown in FIG. 4, the system 10 and/or platform 12 includes a load cell 30. The load cell 30 functions to measure a weight and/or presence of an object 34. Alternatively or additionally, the load cell may measure a pressure a user applies to the object and/or platform when positioning the object on the platform. In some embodiments, a load cell 30 detects a presence of an object 34 positioned on a top face 20 of a platform 12 and the output from the load cell is analyzed by the computing device to determine a weight of one or more objects on the platform, as described elsewhere herein. In some embodiments, the load cell 30 is housed in the platform 12, for example between one or more sidewalls 26 and/or between a top face 20 and a bottom face 22. Alternatively, in some embodiments, the load cell 30 is in a separate, second, or additional platform.

In one embodiment, the load cell 30 is a strain gauge, such that the force imposed upon the platform by the object 34 deforms the strain gauge. The deformation of the strain gauge results in a change in electrical resistance read by the processor 36, 56. In one embodiment, the load cell 30 is a piezoelectric load cell 30, such that deformation of the piezoelectric material results in a change in voltage output read by the processor 36, 56. In one embodiment, the load cell 30 is a hydraulic load cell, such that the increased pressure on the piston and diaphragm results in an increase of oil pressure, which produces a change in pressure read by the processor 36, 56.

In some embodiments, as shown in FIG. 4, the system 10 and/or platform 12 includes a tag reader 32. The tag reader functions to identify a type of an object 34 by reading a tag 38 coupled to or associated with the object 34. In some embodiments, the tag reader 32 also functions to determine a presence of the object 34, such that once the tag 38 associated with the object 34 is detected by the tag reader 32, the system knows that the object 34 is present, for example on the platform 12 or at least in proximity to the platform 12. For example, the tag reader 32 determines a type of an object 34 in physical proximity (e.g., close to, next to, adjacent to, near, etc.) to the platform 12 by transmitting an interrogating signal (e.g. radio waves) to the tag 38 in the object 34 via an antenna 40, and the tag 38 receives the interrogating signal and responds with its unique information (e.g., type of game piece being played, product type, etc.). In some embodiments, the physical proximity is 0.5 cm to 10 cm. In one embodiment, the physical proximity is 2 cm to 4 cm. In one embodiment, the physical proximity is substantially or about 3 cm. In some embodiments, the tag reader 32 uses radio waves. In one such embodiment, the tag reader 32 uses radiofrequency identification (RFID) (e.g., low frequency, high frequency, ultra-high frequency). In one such embodiment, the tag reader 32 uses near field communication or high-frequency RFID.

In some embodiments, the tag reader 32 may be housed in the platform 12, for example between one or more sidewalls 26 and/or between a top face 20 and a bottom face 22. Alternatively, the tag reader 32 may be a separate device, housed in a separate or second platform, or part of a computing device 14.

In some embodiments, the tag 38 is a beacon that transmits information via radio waves (e.g., Bluetooth, BLE, etc.) to a receiving radio, for example in the platform 12.

In some embodiments, the tag reader 32 is a scanner. In one such embodiment, the tag reader 32 is a barcode scanner and the tag 38 is a barcode. In one such embodiment, the tag reader 32 is a QR code scanner and the tag 38 is a QR code.

In some embodiments, the tag reader 32 is a camera. In one such embodiment, the tag reader 32 photographs the object 34, and the image of the object 34 is analyzed to determine the type of the object 34.

In some embodiments, the tag reader 32 is a magnetic reading head and the tag 38 is a magnetic strip. For example, information or data about the type of the object 34 is stored in the magnetic strip by modifying the magnetism of iron-based magnetic particles on a band of magnetic material in the magnetic strip. In some embodiments, the tag reader 32 is a chip reader or RFID reader and the tag 38 is a chip. For example, the information or data about the type of the object 34 is stored in an integrated circuit in the chip. The chip is inserted or dipped into a tag reader 32 or read without contact by a tag reader 32 (e.g., RFID reader).

In some embodiments, the tag 38 interrogated by the tag reader 32 is a passive tag (i.e., does not have its own power source). In some embodiments, the tag 38 interrogated by the tag reader 32 is an active tag (i.e., includes its own power source). In some embodiments, the tag 38 interrogated by the tag reader 32 is a battery-assisted passive system (i.e., uses integrated power source (e.g., battery) to power on tag). In some embodiments, the tag 38 is a read-only tag. In some embodiments, the tag 38 is a read-write tag.

In some embodiments, as shown in FIG. 4, the system 10 and/or platform 12 include one or more user input elements 46. The user input elements 46 function to receive input from a user that effect a functioning of the platform 12 and/or computing device 14. A user input element 46 may include: a button, slider, toggle button, toggle switch, switch, and/or any other type of control. In some embodiments, the load cell 30, tag reader 32, radio 42, and/or other system components function as the user input element. For example, a user input element 46 may include: and on/off switch; a rare button or switch (i.e., for resetting a load cell); a switch that selects a level of play fro the platform/game; a switch that turns on/off one or more components (e.g., load cell, tag reader, light module, power source, radio, etc.) of the system 10; wake up or start the system 10 from a sleep or off state; and/or any other type of switch or button.

In some embodiments, as shown in FIG. 3, one or more of the platform 12 and computing device 14 include a display 50. In some such embodiments, the display 50 may include virtual user input elements: buttons, sliders, toggle buttons, toggle switches, switches, dropdown menus, combo boxes, text input fields, check boxes, radio buttons, picker controls, segmented controls, steppers, and/or any other type of control to effect the functioning of the platform and/or computing device. In some embodiments, the user may use different tactile or haptic lengths or pressures to navigate on the display. For example, a user may use a short press, long press, light press, or forceful press to navigate on the display. The display 50 may includes a Thin Film Transistor liquid crystal display (LCD), in-place switching LCD, resistive touchscreen LCD, capacitive touchscreen LCD, organic light emitting diode (LED), Active-Matrix organic LED (AMOLED), Super AMOLED, Retina display, Haptic/Tactile touchscreen, and/or Gorilla Glass.

Figure 8:
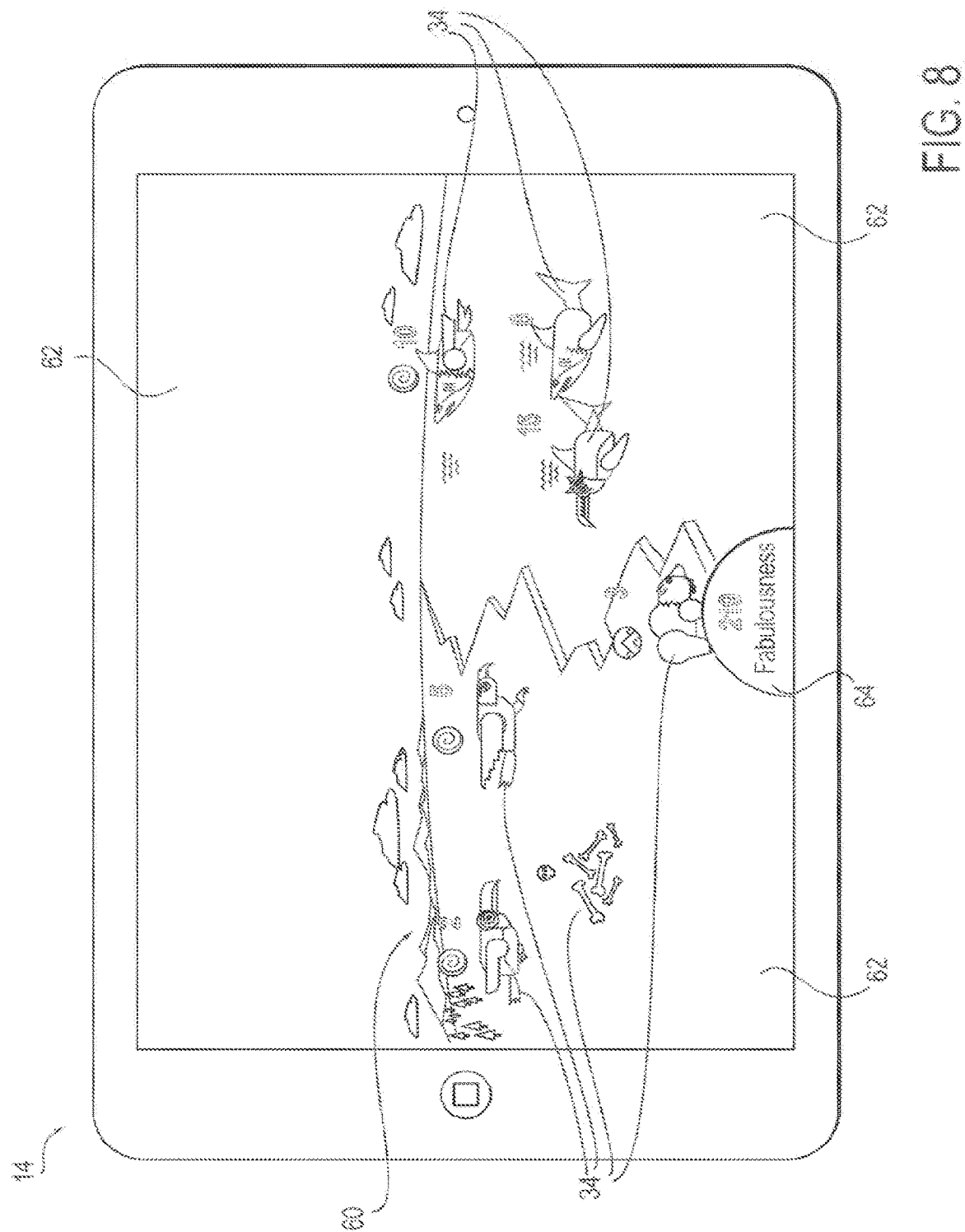
FIG. 8 illustrates one embodiment of a digital user experience.

In some embodiments, the display 50 of the platform 12 and/or computing device 14 is configured to display a digital user experience 60, as shown in FIG. 8. For example, the digital user experience 60 may display one or more objects 34 in a virtual world, a location of an object, a feature or characteristic of an object, a point total for the game or a user, an environment 62 (e.g., land, sea, air, warehouse, supermarket, shelf, store, digital user experience, etc.), and/or update based on the type and/or presence of the object 34. In some embodiments, the digital user experience 60 includes a score or point total 64 for one user or a plurality of users.

In some embodiments, as shown in FIG. 4, the system 10 and/or platform 12 includes a light module 48. The light module 48 functions to indicate a status of the system component. In some embodiments, the light module 48 is a light-emitting diode (LED), organic LED (OLED), fluorescent light, and/or any other type of light. A status of a system component indicated by the light module 48 may include: a power status (e.g., on, off, fully charged, low battery, etc.); an update status (e.g., update required, fully up-to-date, etc.); a connection status (e.g., connected to computing device, not connected to computing device, connected to server, not connected to server, connected to Internet, etc.); a game status (e.g., new game, game ending, current highest point total, etc.); a status of an object on the platform (e.g., weight of object detected, presence of object detected, type of object detected, etc.); or any other type of status. In some embodiments, the color of the light module 48 changes to indicate a status of the system 10 and/or platform 12. Alternatively or additionally, the light module 48 may flash in a pattern or blink to indicate a status of the system 10 and/or platform 12.

In some embodiments, as shown in FIG. 1 and FIG. 3, the system 10 optionally includes a computing device 14. The computing device 14 functions to receive load cell and/or tag information from the platform 12 to determine a type of the object 34, location of the object 34, and/or the presence or absence of the object 34. Alternatively, in some embodiments, the platform 12 functions as the computing device 14. In some embodiments, the computing device 14 is a stationary computing device. In some such embodiments, the stationary computing device includes a desktop computer or a workstation. In some embodiments, the computing device 14 is a mobile or portable computing device. In some such embodiments, a portable computing device includes, but is not limited to, a laptop, netbook, tablet, mobile phone, personal digital assistant, or wearable device (e.g., Google Glass, Apple Watch, etc.). In some embodiments, the computing device 14 is a computational device, wrapped in a chassis that includes a display (visual with or without touch responsive capabilities), a central processing unit (e.g., processor or microprocessor), internal storage (e.g., flash drive), n number of components (e.g., specialized chips and/or sensors), and/or n number of radios (e.g., WLAN, LTE, WiFi, Bluetooth, GPS, radiofrequency, etc.).

As shown in FIG. 3 and FIG. 4, the computing device 14 and the platform 12 each include a processor 36, 56 (e.g., microcontroller, microprocessor, etc.). In some embodiments, the processor 36, 56 is coupled, via one or more buses, to the memory 58 in order to read information from and write information to the memory 58. The memory 58 may be any suitable computer-readable medium that stores computer-readable instructions for execution by computer-executable components. In some embodiments, the computer-readable instructions include software stored in a non-transitory format, some such software having been downloaded as an application 70 (e.g., digital user experience) onto the memory 58 of the computing device 14 and/or the platform 12. The processor 36, 56, in conjunction with the software stored in the memory 58, executes an operating system and one or more applications. Some methods described elsewhere herein may be programmed as software instructions contained within the one or more applications stored in the memory 58 and executable by the processor 36, 56.

Figure 5C:
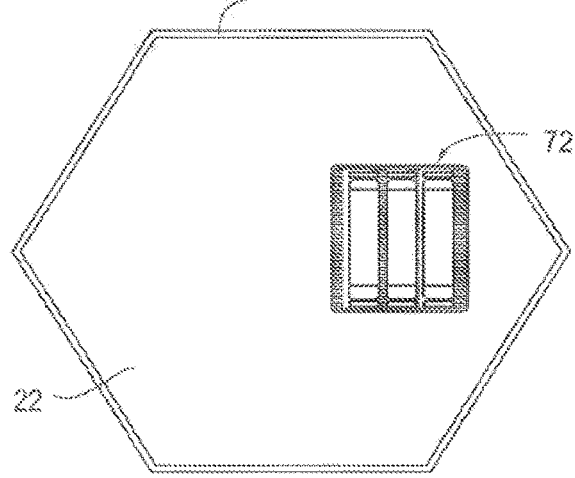
FIG. 5C illustrates a bottom view of one embodiment of a platform.

In some embodiments, as shows in FIG. 3, FIG. 4, and FIG. 5C, a power source 72, 82, such as a battery is included within the computing device 14 and/or platform 12 and is electrically coupled to provide power to the processor 36, 56 and other system components (e.g., load cell, tag reader, light module, user input element(s), radios, etc.). The power source 72, 82 may be rechargeable or disposable.

METHODS

In some embodiments, the computing device and/or platform include a computer-readable medium having non-transitory, processor-executable instructions stored thereon. Execution of the instructions causes a first processor associated with the platform (i.e., platform processor) and/or a second processor associated with the computing device (i.e., computer processor) to perform a method including receiving an output from the platform. In some embodiments, the output details or describes one or more of a presence of an object detected by the tag reader, a type of an object detected by the tag reader; a location (e.g., on the platform, not on the platform, undetected, etc.) of the object, and/or a current weight of the object or a plurality of objects within a defined area, for example on the platform. In some embodiments, the output includes real-time data or a real-time data feed (e.g., via Bluetooth, BLE, etc.) from the platform to the computing device or from the computing device to the platform. The real-time data or real-time data feed may include a status (e.g., on the platform, off of the platform, near the platform, undetected, in the stack, etc.) of an object and/or a substantially continuous data feed indicating the perceived weight of the one or more objects on the platform. In some embodiments, the status may indicate a stability of the stack comprising two or more objects on the platform.

In some embodiments, the method includes analyzing the real-time data feed using the computer processor in the computing device. Alternatively, the method is performed by the platform processor. In some embodiments, the real-time data feed is analyzed by the computing device using digital signal processing techniques known to one of skill in the art (e.g., Fourier transforms, data peak detection, discrete wavelet transform, etc.). The analyzed real-time data feed may inform the system and/or a user about one or more objects on the platform, about a plurality of objects on the platform (e.g., stack of objects), or a user's interaction with one or more objects and/or systems components. The analyzed real-time data feed or processed output may indicate a quality of positioning of the object on the platform (e.g., rough, bad, delicate, etc.); how a user interacted with one or more objects on the platform and/or the stack (e.g., tapped the stack, knocked on the stack, pressed the stack, removed an object, added an object, etc.); the stability of an object and/or stack on the platform; an amount of lapsed time between determining the type of the object and the presence of the object; a completion of a challenge (e.g., press on the object or the plurality of objects on the platform; tap on the object or the plurality of objects; etc.); and/or any other information.

For example, the quality of positioning the object on the platform may be determined by quantifying and analyzing the time lapse between the system detecting the type of the object and the presence of the object on the platform; and/or determining the number of times the real-time weight data (as measured by the load cell) increased or decreased during positioning of the object on the platform (e.g., indicating number of attempts at object placement). Further, the system may determine if a user has completed a challenge, for example by determining if a user is knocking or tapping on the stack, and/or platform by counting the duration and/or number of "peaks" in the weight data, real-time data feed, or processed output; or by detecting additional transient weight on the platform to determine if a user pressed on an object or a plurality of objects on the platform.

In some embodiments, the method further includes displaying a digital user experience determined by the received output from the platform or changing or updating the digital user experience (e.g., displays more or less objects, changes an appearance of an object, changes an appearance of an environment of the digital user experience, updates a score or point total, ends or starts a game, etc.) in response to the received output from the platform. In some embodiments, a feature of the digital user experience is updated in response to the received output from the platform. In some such embodiments, a feature includes: a characteristic of a beast, a characteristic of an environment surrounding the beast, an appearance of an object; an appearance of an environment, etc.

Figure 9:
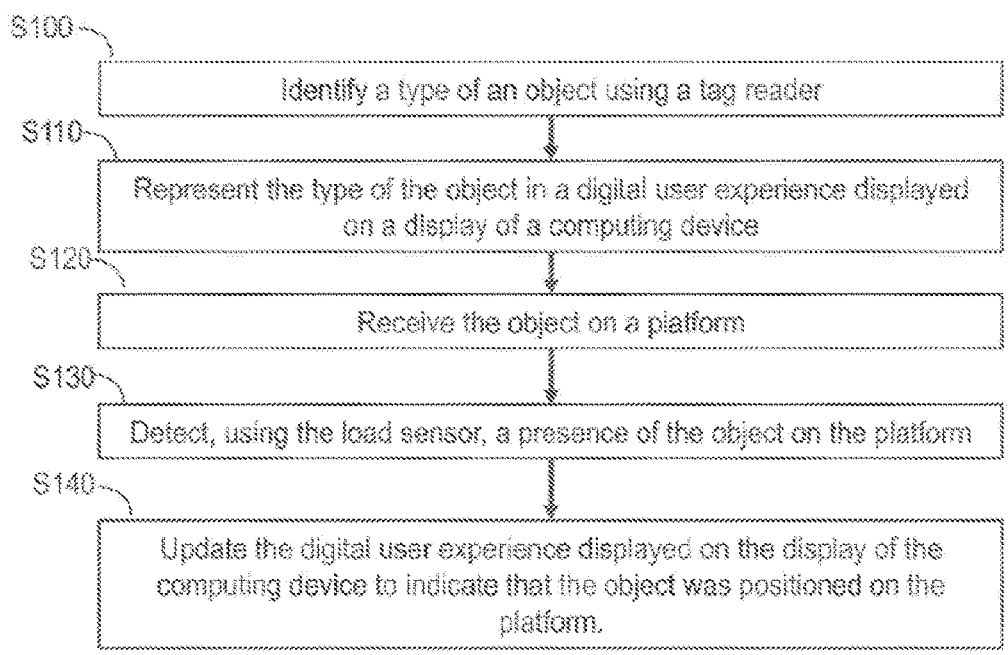
FIG. 9 illustrates a flow chart of one embodiment of a method of identifying objects in a stack and, optionally displaying the objects in a digital user experience.

As shown in FIG. 9, one embodiment of a method for identifying objects in a stack and displaying the objects in a digital user experience includes identifying a type of a first object using a tag reader S100; representing the type of the first object in a digital user experience displayed on a display of a computing device S110; receiving the first object on a platform S120; detecting, using the load sensor, a presence of the first object on the platform S130; and updating the digital user experience displayed on the display of one or more of the computing device and the platform to indicate that the first object was positioned on the platform S140. The method functions to detect a presence and/or type of an object in a stack or amongst a plurality of objects (e.g., in a pile, basket, bin, load, etc.). In some embodiments, the method of FIG. 9 is performed by the platform processor; in some embodiments, the method of FIG. 9 is performed by the computer processor or a combination of the platform processor and the computer processor.

As shown in FIG. 9, one embodiment of a method for identifying objects in a stack includes block S100, which recites identifying a type of a first object using a tag reader. Block S100 functions to acquire information or data about an object by reading a tag coupled to or associated with the object. In some embodiments, the tag reader identifies the object amongst a plurality of objects. In some embodiments, the tag coupled to the object is in physical proximity to the tag reader, for example 0.5 cm to 10 cm. Alternatively, the tag coupled to the object is at a distance from the tag reader, for example if Wi-Fi or other cellular or wireless protocol is used to transmit the data or information. In some embodiments, the step of identifying includes reading or scanning a tag associated with or coupled to the object and transmitting information or data, for example contained in an integrated circuit in the tag, chip, or beacon, to the platform, server, and/or computing device. In some embodiments, identifying includes analyzing the information or data received from the tag to determine a type of an object, for example by comparing the information or data to a database, look-up table, or other resource or data source.

As shown in FIG. 9, one embodiment of a method for identifying objects in a stack includes block S110, which recites representing the type of the first object in a digital user experience displayed on a display of one or more of a computing device and the platform. Block S110 functions to visually notify the user that the type of the object has been detected, identified, and/or determined. In some embodiments, representing may further include transmitting the type of the object from the platform to the computing device and/or server. In some embodiments, representing includes rendering a visualization of the object or an environment in which the object evolves on a display of the platform and/or computing device. In some embodiments, the object is represented by a sketch, an animation, an image, a photograph, an icon, a series of photos or images, a video, a graphical representation, or any other representation.

As shown in FIG. 9, one embodiment of a method for identifying objects in a stack includes blocks S120 and S130, which recite receiving the first object on a platform: and detecting, using the load sensor, a presence of the first object on the platform. Blocks S120 and S130 function to verify, validate, or confirm the presence of the object on the platform. In some embodiments, the method further includes measuring or detecting a weight of the object using a load cell associated with or housed in the platform. Further, the method may include receiving a plurality of objects on the platform in succession or simultaneously. In some embodiments, receiving and detecting include notifying (e.g., audibly, visually, haptically, etc.) a user that the object was positioned on the platform, for example in a limited amount of time. For example, the user may be notified by a noise (e.g., beep, chime, call, voice, etc.), a message (e.g., push notification, short message service (SMS), email, etc.), or by vibration or other haptic response.

As shown in FIG. 9, one embodiment of a method for identifying objects in a stack includes block S140, which recites updating the digital user experience displayed on the display of one or more of the computing device and the platform to indicate that the first object was positioned on the platform. In some embodiments, updating includes: adding the object to an environment in the digital user experience, updating the object (e.g., changing the shape, color, size; merging two or more objects together; removing a different object from the environment; changing a point total or score; indicating a total weight for all objects positioned on the platform; etc.); analyzing the object, showing a destination for the object, showing a price of the object, etc.

Figure 10:
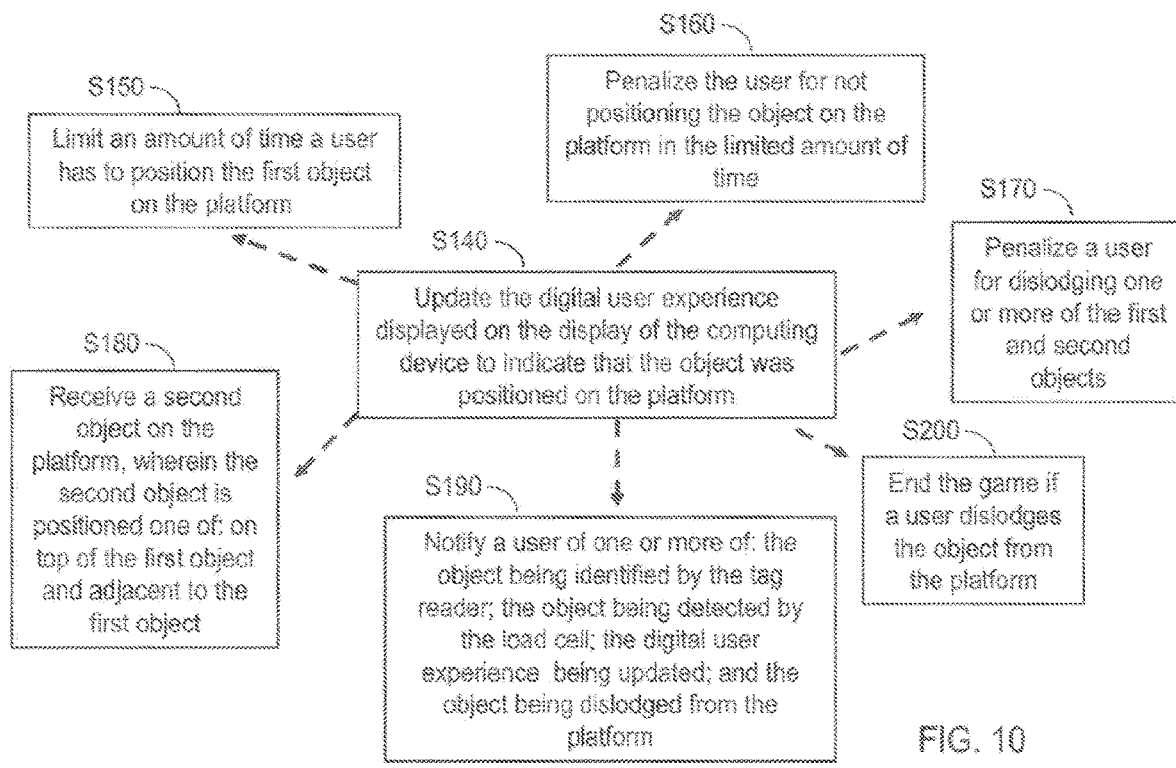
FIG. 10 illustrates a flow chart of various embodiments of continuing or finishing a game comprising objects identified in a stack and displayed in a digital user experience.

In some embodiments, as shown in FIG. 10, a method for identifying objects in a stack optionally (indicated by dashed arrows) includes one or more of: limiting an amount of time a user has to position the first object on the platform S150; penalizing the user for not positioning the first object on the platform in the limited amount of time S160; penalizing a user for dislodging one or more of the first and second objects S170; receiving a second object on the platform, wherein the second object is positioned one of: on top of the first object and adjacent to the first object S180; notifying a user of one or more of: the first object being identified by the tag reader, first object being detected by the load cell; the digital user experience being updated, and the first object being dislodged from the platform S190; and/or ending the game if a user dislodges the first object from the platform S200. In some embodiments, the method of FIG. 10 is performed by the platform processor, in some embodiments, the method of FIG. 10 is by the computer processor or a combination of both the platform processor and the computer processor.

As shown in FIG. 10, one embodiment of a method for identifying objects in a stack optionally includes block S150, which recites limiting an amount of time a user has to position the first object on the platform. In some embodiments, for example, the user may be given by the system 1 second to 5 minutes to position the piece on the platform or stack. In one embodiment, the user is given 1 second to 10 seconds. In one embodiment, the user is given 5 seconds. In some embodiments, as shown in blocks S160, S170, and S200, if the user fails to position the object on the platform in the limited amount of time or if the user dislodges one or more objects from the platform or stack, the system may penalize the user, for example, by ending a points bonus multiplier that was in play, removing points from the user's score, ending the game, eliminating the user's object(s) from the digital user experience, creating an environmental catastrophe (e.g., asteroid, hurricane, radioactive radiation, typhoon, etc.) in the digital user experience, causing extinction of one or more objects, or any other penalty.

As shown in FIG. 10, one embodiment of a method for identifying objects in a stack optionally includes block S180, which recites receiving a second object on the platform, wherein the second object is positioned one of on top of the first object, adjacent to the first object, or substantially underneath or below the first object. Block S180 functions to create a stack of objects on the platform. For example, the stack may be vertical. In some embodiments, the objects include complementary surfaces, indentations, or grooves and protrusions that facilitate stacking two or more objects relative to one another.

As shown in FIG. 10, one embodiment of a method for identifying objects in a stack optionally includes block S190, which recites notifying a user of one or more of: the object being identified by the tag reader, the object being detected by the load cell; the digital user experience being updated, and an object being dislodged from the platform. For example, the user may be audibly (e.g., call, chime, beep, etc.), visually (e.g., change in the light module, change in the display on the platform and/or computing device, change in the digital user experience, etc.), or haptically (e.g., vibration of platform or object) notified. In some embodiments, the user is notified by a push notification, SMS, email, or other notification received on the computing device. In some embodiments, the light module in the platform and/or computing device is activated (e.g., lights up) or deactivated (e.g., turns off) to notify a user.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the cushion and/or portable computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "object" may include, and is contemplated to include, a plurality of objects. At times, the claims and disclosure may include terms such as "a plurality," "one or more," or "at least one," however, the absence of such terms is not intended to mean, and should not be interpreted to mean, that a plurality is not conceived.

The term "about" or "approximately," when used before a numerical designation or range (e.g. to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, system, or method.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic (s) of the claimed invention. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A game system for detecting an addition of a game piece and a type of the game piece to a stack of one or more game pieces in a defined area associated with a game, the game system comprising:
   a tag reader configured to determine the type of the game piece, wherein the game piece has a known weight, and wherein the game piece comprises a tag that is readable by the tag reader;
   a load cell configured to detect the addition of the game piece to the stack of one or more game pieces present in the defined area associated with the game, wherein the load cell detects a change that corresponds to the known weight of the game piece when the game piece is added to the stack of one or more game pieces present in the defined area; and
   a platform comprising a bottom face for contacting a support surface and a top face configured to provide a surface for receiving the stack of one or more game pieces,
   wherein the bottom and top faces define a housing configured to receive the load cell and the tag reader,
   wherein the addition of the game piece is detected by the load cell housed in the platform when the game piece is added to the stack of one or more game pieces positioned on the top face of the platform,
   wherein the type of the game piece is determined by the tag reader housed in the platform when the game piece is in physical proximity to the platform, and
   wherein the game system further comprises a first processor communicatively coupled to the tag reader and the load cell and a computer-readable medium having non-transitory processor-executable instructions stored thereon,
   wherein execution of the instructions causes the first processor to perform operations, the operations comprising:
      receiving an output from one or more of the tag reader and the load cell, wherein the output comprises one or more of the addition of the game piece and the type of the game piece; and
      causing, based at least in part on the one or more of the addition of the game piece and the type of the game piece, an update to a virtual world associated with the game.

2. The game system of claim 1, further comprising the game piece.

3. The game system of claim 1, wherein said operation of causing comprises:
   transmitting the output from one or more of the tag reader and the load cell to a computing device comprising a second processor, wherein the computing device is communicatively coupled to the platform.

4. The game system of claim 3, wherein the output comprises a real time data feed of a status of the game piece.

5. The game system of claim 1, wherein the tag comprises one of a radiofrequency identification tag, a near field communication tag, and a low-energy Bluetooth tag.

6. The game system of claim 1, wherein the top face is flat.

7. The game system of claim 1, wherein the bottom face is flat.

8. The game system of claim 1, wherein the type of the game piece is one of a beast piece, an action piece, an element piece, and a miracle piece.

9. The game system of claim 1, wherein the type of the game piece is one of a consumable product and non-consumable product.

10. The game system of claim 1, wherein the type of the game piece is one of a game piece for measuring dexterity, coordination, memory, and motor skills.

11. The game system of claim 1, wherein the addition of the game piece is detected by determining the known weight of the game piece in the defined area.

12. A game for identifying game pieces in a stack of one or more game pieces and updating a virtual world of a digital user experience based on the game pieces identified in the stack, the game comprising:

a game piece of known weight comprising a tag;
a tag reader configured to determine a type of the game piece, wherein the tag of the game piece is readable by the tag reader;
a load cell configured to detect a change that corresponds to an addition of the game piece to the stack of one or more game pieces present in a defined area associated with the game; and
a platform comprising at least one face for receiving the stack of one or more game pieces,
wherein the platform is communicatively coupled to the load cell and the tag reader,
wherein the addition of the game piece in the defined area is detected by the load cell when the game piece is added to the stack of one or more game pieces,
wherein the type of the game piece is determined by the tag reader when the game piece is in physical proximity to the platform, and
wherein the game further comprises a first processor communicatively coupled to the tag reader and the load cell and a computer-readable medium having non-transitory processor-executable instructions stored thereon,
wherein execution of the instructions causes the first processor to perform operations, the operations comprising:
  receiving an output from one or more of the tag reader and the load cell, wherein the output comprises one or more of the addition of the game piece and the type of the game piece; and
  causing, based at least in part on the one or more of the addition of the game piece and the type of the game piece, an update to the virtual world of the digital user experience.

13. The game of claim 12, wherein the type of the game piece is one of a beast piece, an action piece, an element piece, and a miracle piece.

14. A method of detecting an addition of a first game piece to a stack of one or more game pieces and displaying the game pieces in a digital user gaming experience, the method comprising:

identifying a type of the first game piece using a tag reader, wherein the first game piece comprises a tag, and wherein the first game piece is identified when it is in physical proximity to the tag reader;
causing the type of the first game piece to be represented in a digital user experience displayed on a display of a computing device;
detecting, using the load sensor, the addition of the first game piece to the stack of one or more game pieces present on a platform, wherein the load sensor detects a change that corresponds to the known weight of the game piece when the game piece is added to the stack of one or more game pieces present on the platform; and
causing, based at least in part on the addition of the game piece and the type of the game piece, the digital user experience displayed on the display of the computing device to be updated to indicate that the first game piece was added to the stack of one or more game pieces present on the platform.

15. The method of claim 14, further comprising limiting an amount of time a user has to position the first game piece on the platform.

16. The method of claim 15, further comprising penalizing the user for not positioning the first game piece on the platform in the amount of time.

17. The method of claim 14, further comprising receiving a second game piece on the platform, wherein the second game piece is positioned one of: on top of the first game piece, adjacent to the first game piece, and underneath or below the first game piece.

18. The method of claim 17, further comprising penalizing a user for dislodging one or more of the first and second game pieces.

19. The method of claim 14, further comprising causing a user to be notified of one or more of:
  the first game piece being identified by the tag reader;
  the first game piece being detected by the load sensor; and
  the first game piece being dislodged from the platform.

* * * * *